(12) United States Patent
Karau

(10) Patent No.: US 12,053,911 B2
(45) Date of Patent: *Aug. 6, 2024

(54) MANUFACTURED RETAINING WALL BLOCK WITH IMPROVED FALSE JOINT

(71) Applicant: PAVESTONE, LLC, Atlanta, GA (US)

(72) Inventor: William H. Karau, Blanco, TX (US)

(73) Assignee: PAVESTONE, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/096,229

(22) Filed: Jan. 12, 2023

(65) Prior Publication Data

US 2023/0241810 A1 Aug. 3, 2023

Related U.S. Application Data

(63) Continuation of application No. 17/346,785, filed on Jun. 14, 2021, now Pat. No. 11,801,622, which is a
(Continued)

(51) Int. Cl.
*E02D 29/02* (2006.01)
*B28B 7/00* (2006.01)
(Continued)

(52) U.S. Cl.
CPC ............... *B29C 41/36* (2013.01); *B28B 7/00* (2013.01); *B28B 7/007* (2013.01); *B28B 7/0097* (2013.01); *B28B 7/183* (2013.01); *B28B 7/28* (2013.01); *B28B 17/0027* (2013.01); *E02D 29/02* (2013.01); *E02D 29/025* (2013.01); *E02D 29/0266* (2013.01); *E04B 2/32* (2013.01); *E04C 1/00* (2013.01); *E04C 1/395* (2013.01);
(Continued)

(58) Field of Classification Search
CPC ... E02D 29/02; E02D 29/025; E02D 29/0266; E04B 2/32; E04B 2002/0208; E04B 2002/0219; E04B 2002/0269; E04C 1/00; E04C 1/395
See application file for complete search history.

(56) References Cited

U.S. PATENT DOCUMENTS

| | | |
|---|---|---|
| 7,410,328 B2 | 8/2008 | Hamel |
| 7,665,250 B2 | 2/2010 | Powell |
| (Continued) | | |

FOREIGN PATENT DOCUMENTS

| | | |
|---|---|---|
| CA | 2544152 C | 6/2013 |
| CA | 2550358 C | 5/2014 |
| EP | 1867798 | 3/2012 |

*Primary Examiner* — Patrick J Maestri
(74) *Attorney, Agent, or Firm* — Jackson Walker LLP; Christopher J. Rourk

(57) ABSTRACT

A retaining wall block having a false joint and a system of retaining wall blocks. The retaining wall block includes a body having a first textured surface and a second textured surface and a false joint dividing the first and second textured surface. The false joint can have a depth divided by the width greater than two inches. The false joint can have an interior angle of less than ten degrees. The system includes a plurality of retaining wall blocks and a first course of retaining wall blocks engaged with a second course of retaining wall blocks below. Each block in the system comprising a front face having a first textured surface and a second textured surface and a false joint dividing the first and second textured surface. The false joint can extend a predetermined depth of a third surface.

20 Claims, 8 Drawing Sheets

Related U.S. Application Data continuation of application No. 16/812,851, filed on Mar. 9, 2020, now Pat. No. 11,034,062, which is a continuation of application No. 15/978,891, filed on May 14, 2018, now Pat. No. 10,583,588.

(51) Int. Cl.
- *B28B 7/18* (2006.01)
- *B28B 7/28* (2006.01)
- *B28B 17/00* (2006.01)
- *B29C 41/36* (2006.01)
- *E04B 2/32* (2006.01)
- *E04C 1/00* (2006.01)
- *E04C 1/39* (2006.01)
- *E04B 2/02* (2006.01)

(52) U.S. Cl.
CPC ............... *E04B 2002/0208* (2013.01); *E04B 2002/0219* (2013.01); *E04B 2002/0269* (2013.01)

(56) References Cited

U.S. PATENT DOCUMENTS

| | | |
|---|---|---|
| 7,854,573 B2 | 12/2010 | Knudson et al. |
| 7,866,923 B2 | 1/2011 | Knudson et al. |
| 8,011,152 B2 | 9/2011 | Thomassen |
| 9,744,697 B2 | 8/2017 | Karau |
| 10,087,597 B2 | 10/2018 | Daoust et al. |
| 10,760,242 B2 | 9/2020 | MacDonald et al. |
| 11,034,062 B2 | 6/2021 | Karau |
| 11,554,521 B2 | 1/2023 | Karau |
| 2007/0193181 A1 | 8/2007 | Klettenberg et al. |
| 2007/0292216 A1 | 12/2007 | Hamel |
| 2008/0145148 A1 | 6/2008 | Hamel |
| 2008/0222986 A1 | 9/2008 | Hamel |
| 2012/0151862 A1 | 6/2012 | Daoust et al. |
| 2018/0104853 A1 | 4/2018 | Scherer |
| 2018/0187405 A1 | 7/2018 | Hamel |
| 2020/0217036 A1 | 7/2020 | Becker et al. |

MANUFACTURED RETAINING WALL BLOCK WITH IMPROVED FALSE JOINT

RELATED APPLICATIONS

This non-provisional application is a continuation of U.S. patent application Ser. No. 17/346,785, filed on Jun. 14, 2021, which is a continuation of U.S. patent application Ser. No. 16/812,851, filed on Mar. 9, 2020, now issued as U.S. Pat. No. 11,034,062 on Jun. 15, 2021, which is a continuation of U.S. patent application Ser. No. 15/978,891, filed on May 14, 2018, now issued as U.S. Pat. No. 10,583,588 on Mar. 10, 2020, which are hereby incorporated by reference for all purposes, as if presented herein in its entirety.

This application is also related to U.S. patent application Ser. No. 15/688,784, filed on Aug. 28, 2017, now issued as U.S. Pat. No. 9,999,993 on Jun. 19, 2018, which is a continuation-in-part of U.S. patent application Ser. No. 15/080,276, filed on Mar. 24, 2016, which is now abandoned, which is a continuation of U.S. patent application Ser. No. 15/074,830, filed on Mar. 18, 2016, now issued as U.S. Pat. No. 9,744,697 on Aug. 29, 2017, which is a continuation-in-part of U.S. Design patent application No. 29/543,176, filed on Oct. 21, 2015, now issued as U.S. Design Pat. No. D791,346 on Jul. 4, 2017; U.S. patent application Ser. No. 15/074,830 is a continuation of U.S. patent application Ser. No. 14/311,194, filed on Jun. 20, 2014, which is now abandoned, which claims benefit of and priority to U.S. Provisional Patent Application No. 61/838,205, filed on Jun. 21, 2013.

TECHNICAL FIELD

The present disclosure relates to retaining wall blocks, and more specifically to a retaining wall block having a false joint and a mold for manufacturing such.

BACKGROUND OF THE INVENTION

Retaining wall blocks can be manufactured and arranged in a variety of different ways.

SUMMARY OF THE INVENTION

A manufactured retaining wall block with an improved false joint and a system of retaining wall blocks with an improved false joint is presented herein.

In an embodiment, a retaining wall block having a false joint is presented. The retaining wall block comprises a body having a first surface and a second surface and a false joint dividing the first and second surface and extending a predetermined depth of the body.

In another embodiment, the first and second surface can be textured. The false joint can have a depth divided by the width that is less than a predetermined value. The false joint can also have an exterior angle that is greater than an interior angle. The retaining wall block can also include a base below the body that has at least one ridge to produce at least one engagement cavity. The body and the base can define an H-shaped dimension.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which.

DETAILED DESCRIPTION OF THE INVENTION

Figure 1A:
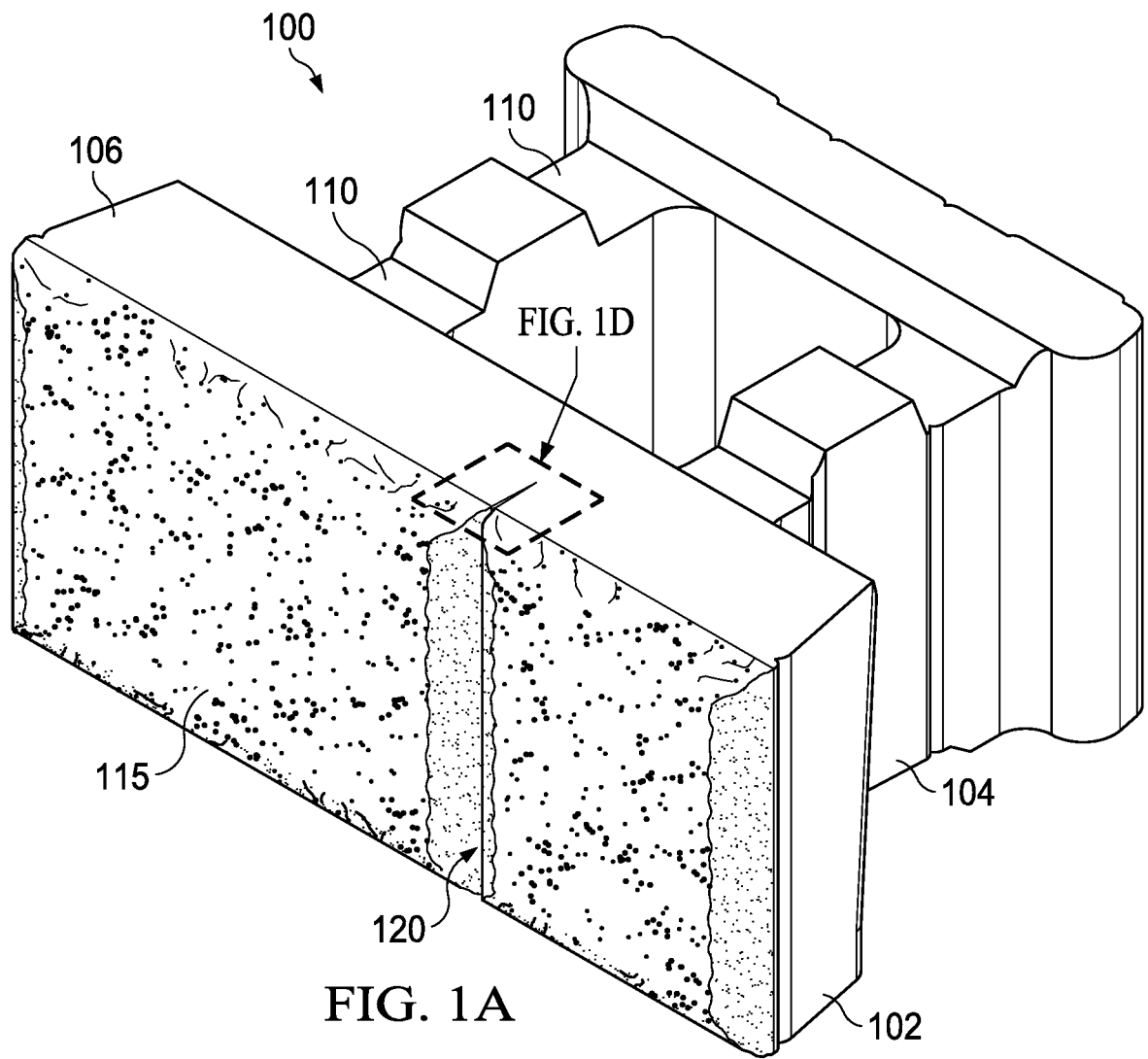
FIGS. 1A through 1D are diagrams of a retaining wall blocks with false joints in accordance with an example embodiment of the present disclosure.

In the description that follows, like parts are marked throughout the specification and drawings with the same reference numerals. The drawing figures might or might not be to scale and certain components can be shown in generalized or schematic form and identified by commercial designations in the interest of clarity and conciseness.

Figure 1B:
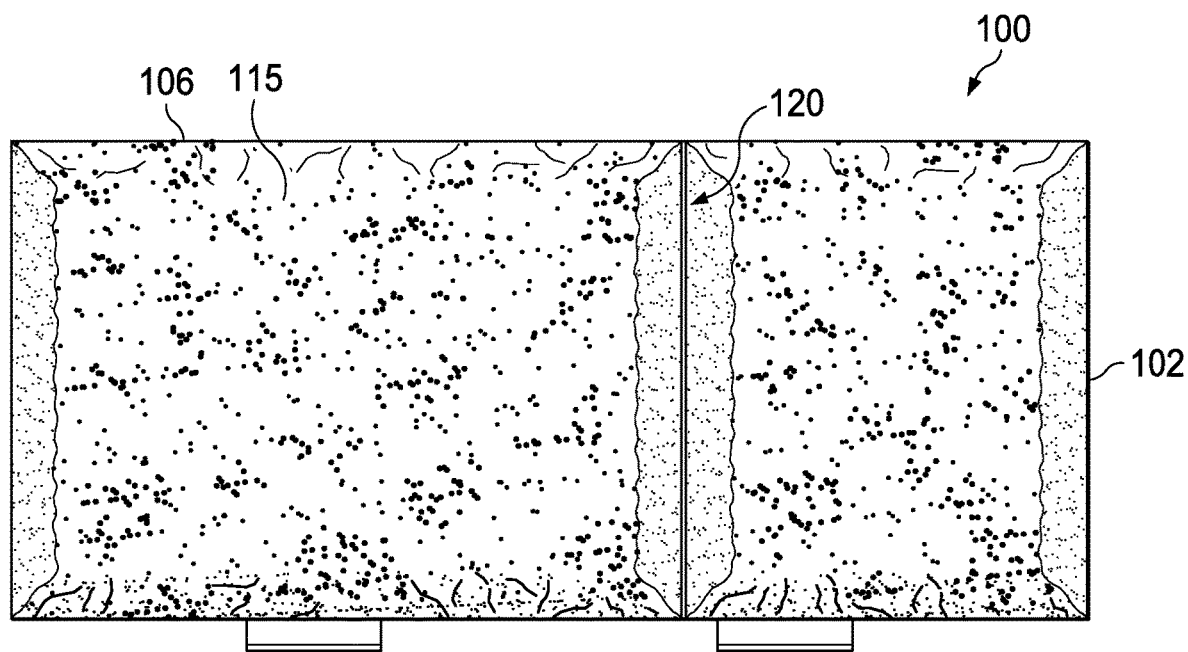
Figure 1C:
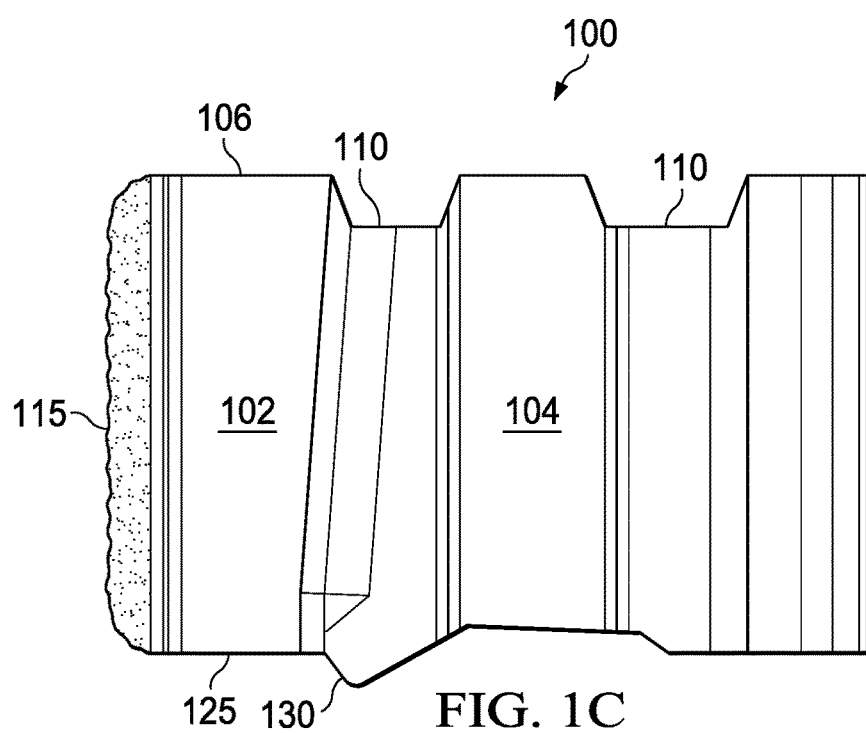

FIGS. 1A through 1C are diagrams of a retaining wall block 100 in accordance with an example embodiment of the present disclosure. Retaining wall block 100 can be formed from masonry, concrete or other suitable materials, using a wet cast process, a dry cast process or other suitable processes. As shown in FIG. 1A, retaining wall block 100 includes a body 102, a base 104, a top face 106, engagement cavity 110, and textured front face 115. Textured front face 115 can be formed by splitting retaining wall block 100 from a second retaining wall block 100, as discussed in greater detail below.

As shown in FIGS. 1A and 1B, front face 115 includes a false joint 120. The false joint 120 can extend the width of the body 102 along the front face 115 and a depth of the body 102. The false joint 120 can be located anywhere along the front face 115 of the body 102 and can be extended to different depths of the body 102. As is more clearly shown in FIG. 1D, the false joint 120 can have an exterior false joint section having an apparent angle $\beta$ and an interior false joint section having an apparent angle $\alpha$. The false joint 120 can have an interior false joint width W and an interior false joint depth D and a depth divided by width (D/W) of greater than a predetermined amount, such as 2 to 3, depending on the size of the body 102, or other suitable amounts. The width W can be equal to or less than 3 mm or other suitable values. The false joint 120 can have a depth of about a third of the depth of the body 102, or other suitable depths. The apparent angle $\alpha$ of false joint 120 can range from less than 10° to greater than 20°, and the apparent angle $\beta$ of false joint 120 can range from less than 60° to greater than 80°. A transition region between the interior false joint section and the exterior false joint section can have a thickness t, where t can be less than or equal to a predetermined value, such as 8 mm, or other suitable values. Furthermore, the body 102 can include multiple false joints 120. Alternate interior and exterior portions are shown as alternatives.

As shown in FIG. 1C, which is a side view of retaining wall block 100, retaining wall block 100 can also include a bottom surface 125 having at least one engagement protrusion 130. Engagement protrusion 130 is configured to interface with engagement cavity 110 of an underlying retaining wall block 100. Furthermore, the front engagement cavity 110 is offset from the location of engagement protrusion 130, so as to result in a staggered incline as successive rows of retaining wall blocks 100 are formed. In one embodiment of the present disclosure, the incline of successive rows of retaining wall blocks 100 is generally vertical with no staggering.

Figure 2A:
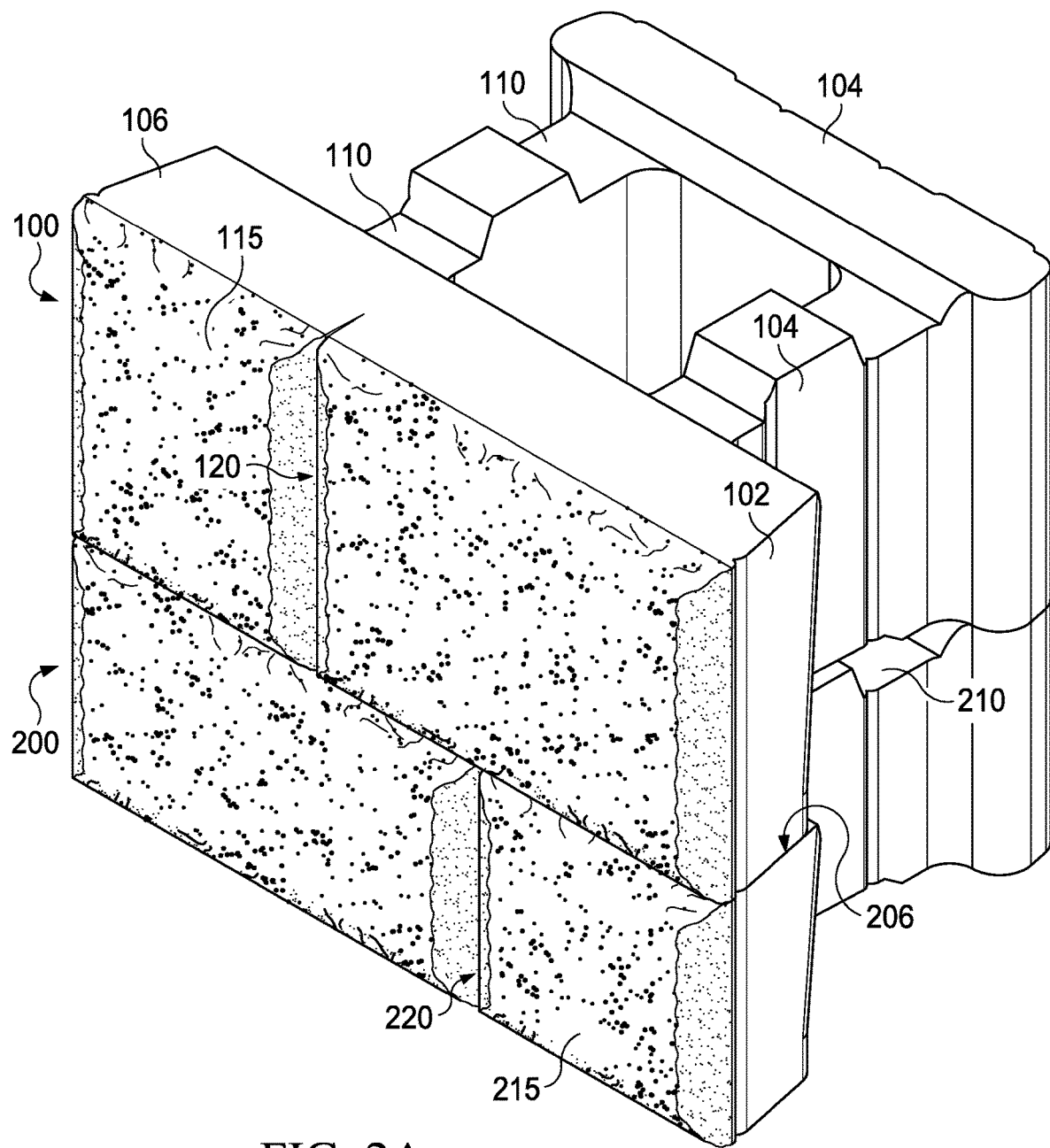
FIGS. 2A through 2C are diagrams of engaged retaining wall blocks with false joints in accordance with an example embodiment of the present disclosure.
Figure 2B:
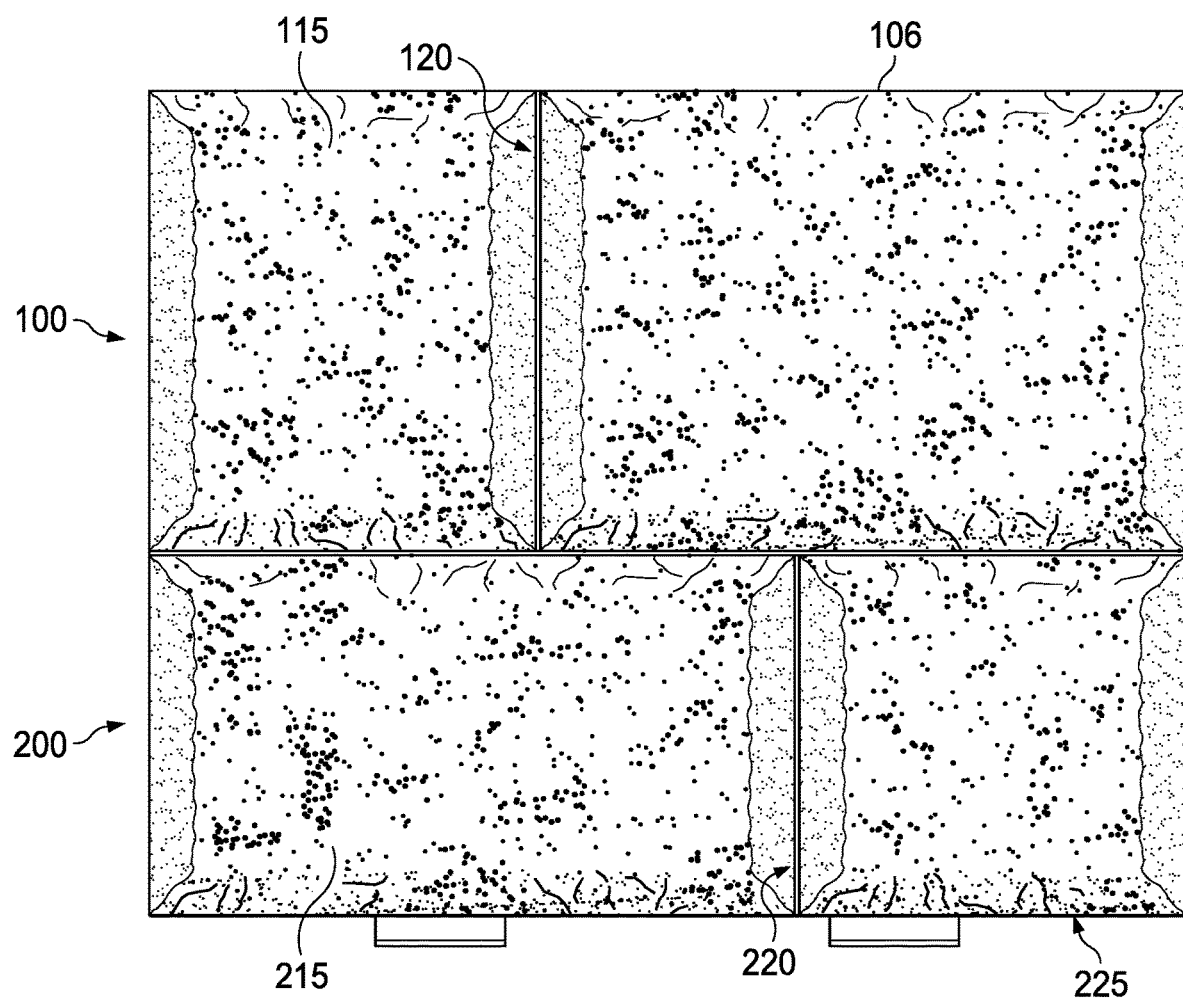
Figure 2C:
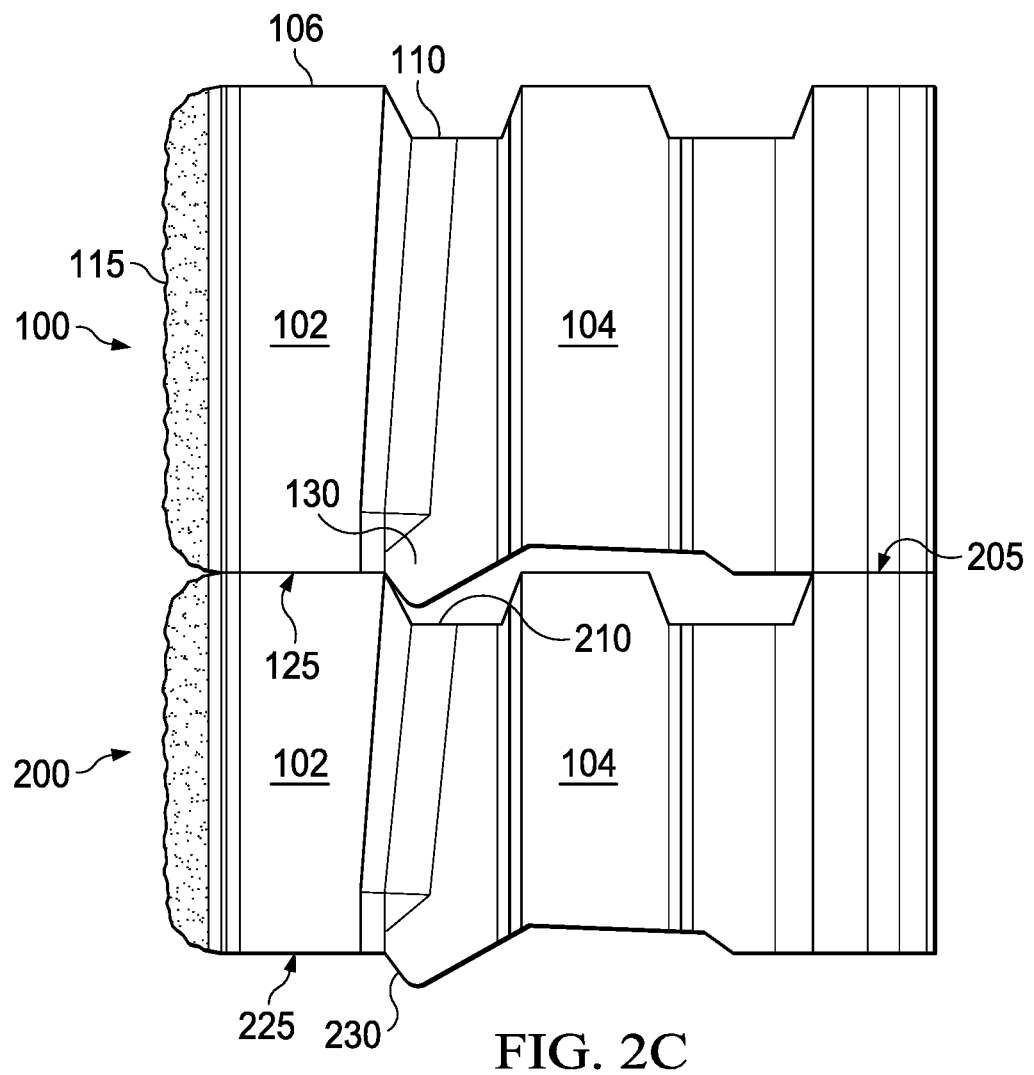

FIGS. 2A through 2C are diagrams of engaged retaining wall blocks 100 and 200, in accordance with an example embodiment of the present disclosure. As shown in FIG. 2A, retaining wall blocks 100 and 200 can have different sizes and can include top faces 106 and 206, respectively, engagement cavities 110 and 210, respectively, and textured front faces 115 and 215, respectively. As previously discussed, retaining wall blocks 100 and 200 also include false joints 120 and 220, as shown in FIGS. 2A and 2B. Likewise, other suitable false joints can also or alternatively be used.

In one embodiment of the present disclosure, first retaining wall block 100 is disposed onto a top surface 206 of a second retaining wall block 200. As shown in FIG. 2C, first retaining wall block 100 can positioned so that engagement protrusions 130 align with and fit into engagement cavity 210 of second retaining wall block 200. In one embodiment of the present disclosure, the angle and configuration of engagement notches 110 and 210 and engagement members 130 and 230 can be varied to allow the blocks 100, 200 to be assembled with an offset. In one example embodiment of the present disclosure, the angle of engagement notches 110 and 210 can be between about 30 degrees and about 90 degrees. Likewise, the angle of engagement members 130 and 230 can be between about 30 degrees and about 90 degrees.

Figure 3:
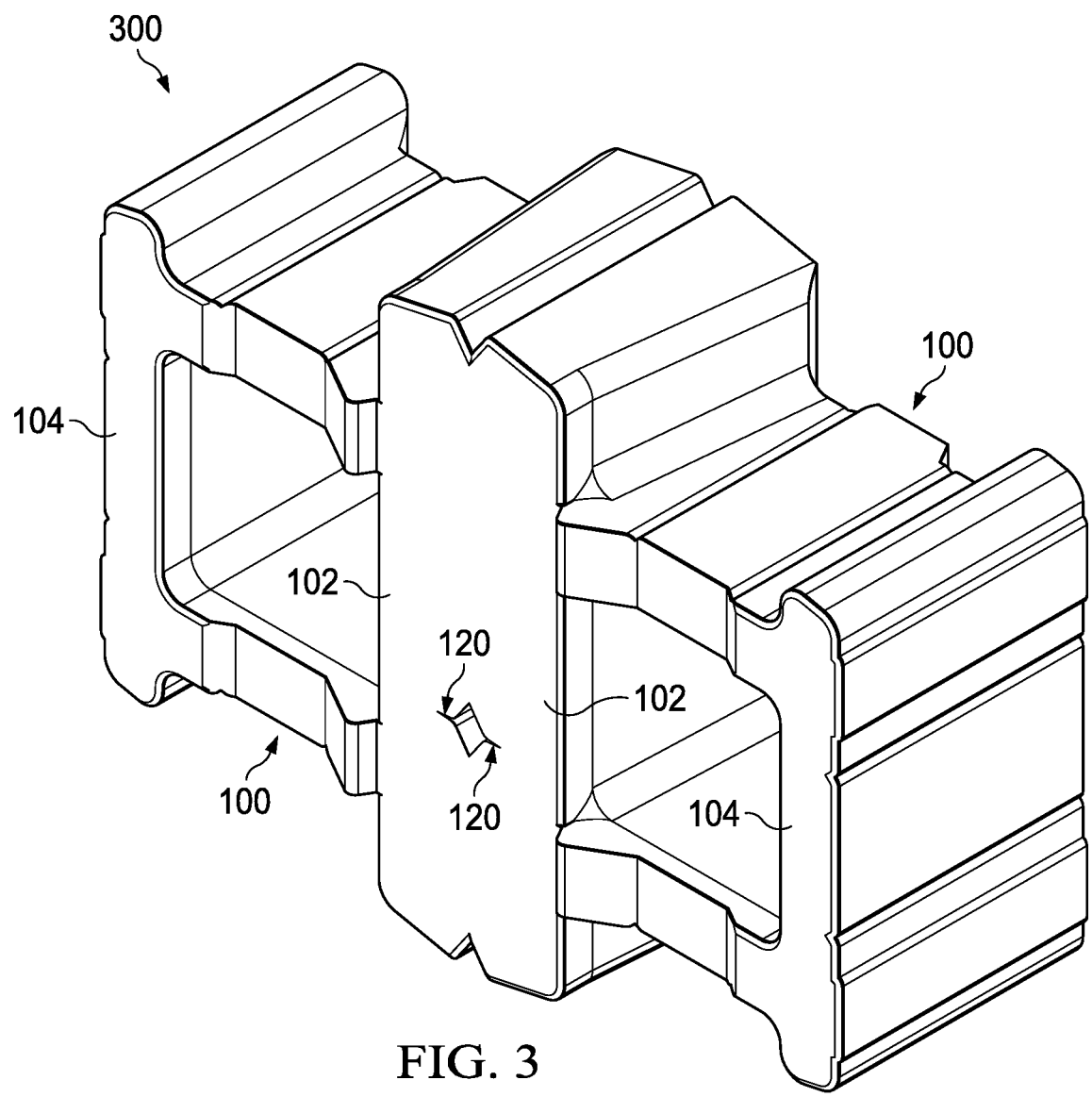
FIG. 3 is a diagram of molded retaining walls blocks with each having a false joint in accordance with an example embodiment of the present disclosure.

FIG. 3 is a diagram of a retaining wall block 300 with false joints 120 formed in the molded product, prior to splitting, in accordance with an example embodiment. Block 300 includes a first block having a body 102 and base 104 casted with a second block having a body 102 and base 104. The individual blocks 100 can be formed by splitting block 300 at the centerline, through the diamond shaped aperture segmenting the false joints 120. The false joints 120 described herein can be cast within the mold at different suitable depths and at different suitable widths, and at varying suitable locations within body 102 corresponding to selected false joint locations.

Figure 1D:
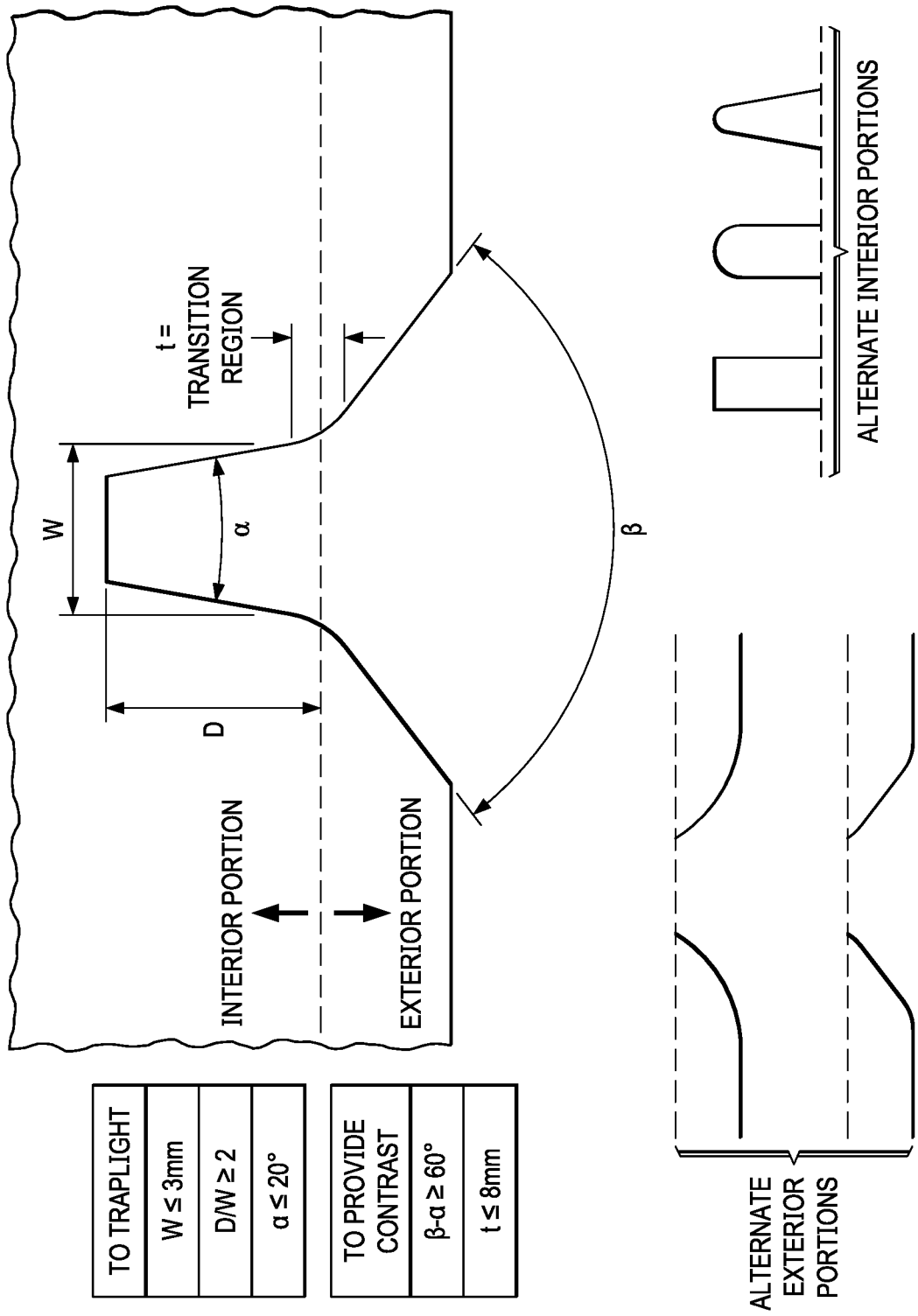
Figure 4:
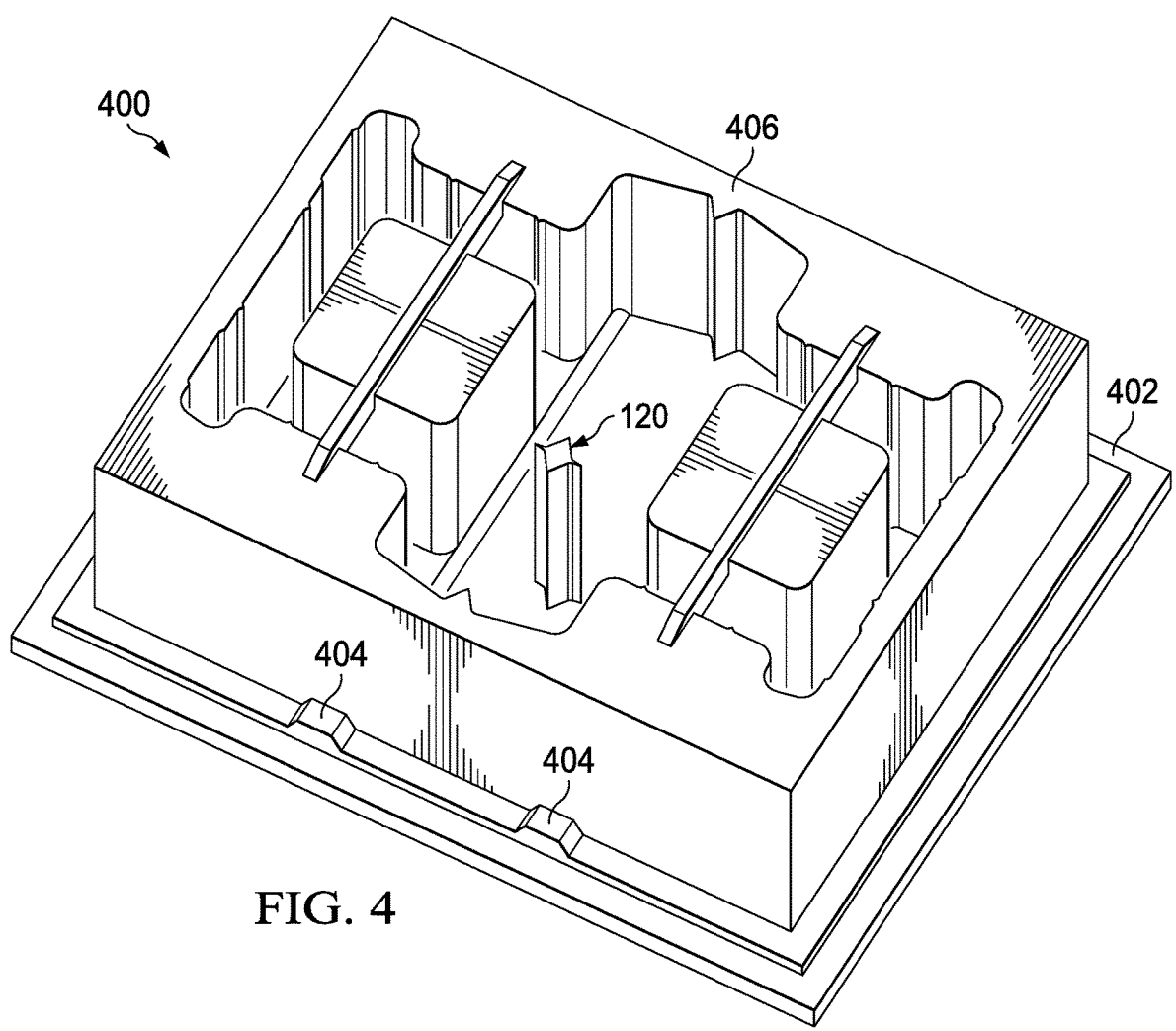
FIG. 4 is a diagram of a mold for providing a false joint, in accordance with an example embodiment of the present disclosure.

FIG. 4 is a diagram of a mold 400 for providing a false joint, in accordance with an example embodiment of the present disclosure. Mold 400 includes base 402, index notches 404, outer frame 406 and false joint 120 frame. When masonry compound or other suitable wet or dry mixes are added to the cavity of mold 400, false joint 120 frame creates a false joint feature, such as shown in FIG. 1D or other suitable false joints. After the block is formed by mold 400, mold 400 can be removed to allow the wet or dry mix to set and cure. False joint 120 frame can be coupled to mold 400 (not explicitly shown), or can be secured in another suitable manner to allow it to be withdrawn prior to setting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A retaining wall block comprising:
a body having a first surface and a second surface; and
a false joint dividing the first surface and the second surface and extending a predetermined depth of the body, wherein the false joint includes a first tapered portion having a first taper angle, a second tapered portion having a second taper angle and a transition region where the second taper angle reduces to the first taper angle;
wherein the false joint has an interior angle of less than 20 degrees that extends for a predetermined distance over a length in the false joint.

2. The retaining wall block of claim 1 wherein a depth of the first tapered portion and the second tapered portion of the false joint divided by a width of the first tapered portion of the false joint is greater than 2.

3. The retaining wall block of claim 1 wherein a depth of the first tapered portion and the second tapered portion of the false joint divided by a width of the first tapered portion of the false joint is less than 3.

4. The retaining wall block of claim 1 wherein the false joint has an exterior angle of greater than 40 degrees that extends for a predetermined distance over a length in the false joint.

5. The retaining wall block of claim 1 wherein the first surface and the second surface are textured.

6. The retaining wall block of claim 1 wherein the false joint extends at least a third of a depth of the body.

7. The retaining wall block of claim 1 further comprising a base behind the first surface and the second surface of the body and having at least one ridge to produce at least one engagement cavity.

8. The retaining wall block of claim 7 wherein the body and the base define an H-shaped structure.

9. A system of retaining wall blocks, the system comprising:
a plurality of retaining wall blocks, one or more of the retaining wall blocks comprising:
a false joint dividing a first surface and a second surface and extending a predetermined depth of a third surface, the false joint having an interior angle and an exterior angle that is greater than the interior angle; and
wherein the exterior angle is greater than 40 degrees and extends for a predetermined distance over a length in the false joint.

10. The system retaining wall blocks of claim 9 wherein the predetermined depth of the third surface of the false joint divided by a width of the interior angle of the false joint is greater than 2.

11. The system of retaining wall blocks of claim 9 wherein the predetermined depth of the third surface of the false joint divided by a width of the interior angle of the false joint is less than 3.

12. The system of retaining wall blocks of claim 9 wherein the interior angle is less than 20 degrees and extends for a predetermined distance over a length in the false joint.

13. The system of claim 9 wherein the first surface and the second surface are textured.

14. The system of retaining wall blocks of claim 9 wherein the false joint extends a third or less of a depth of a body of the retaining wall block.

15. The system of retaining wall blocks of claim 9 further comprising at least one engagement protrusion, wherein the at least one engagement protrusion of a first retaining wall block are configured to engage at least one engagement cavity of an adjacent retaining wall block.

16. The system of retaining wall blocks of claim 15 wherein the at least one engagement protrusion and the at least one engagement cavity of a retaining wall block in a first course and a retaining wall block in a second course are of different dimensions.

17. The system of retaining wall blocks of claim 15, wherein the at least one engagement protrusion of a retaining wall block in a first course of retaining wall blocks is configured to engage with the at least one engagement cavity of a retaining wall block in a second course of retaining wall blocks below.

18. A system of retaining wall blocks, the system comprising:
a plurality of retaining wall blocks, one or more of the retaining wall blocks comprising:
a false joint dividing a first surface and a second surface and extending a predetermined depth of a third surface, the false joint having a first angle and a second angle that is greater than the first angle; and
wherein the second angle is greater than 40 degrees and extends for a predetermined distance over a length in the false joint.

19. The system retaining wall blocks of claim 18 wherein the predetermined depth of the third surface of the false joint divided by a width of the first angle of the false joint is greater than 2.

20. The system of retaining wall blocks of claim 18 wherein the predetermined depth of the third surface of the false joint divided by a width of the first angle of the false joint is less than 3.

* * * * *